Aug. 23, 1938.   P. D'ARAGON   2,127,859
METHOD OF TREATING ARSENIDE AND MIXTURES OF ARSENIDE AND SULPHIDE ORES
Filed June 18, 1936

INVENTOR
PAUL D'ARAGON
BY J. D. O'Connell
ATTORNEY

Patented Aug. 23, 1938

2,127,859

UNITED STATES PATENT OFFICE 2,127,859

METHOD OF TREATING ARSENIDE AND MIXTURES OF ARSENIDE AND SULPHIDE ORES

Paul D'Aragon, Montreal, Quebec, Canada

Application June 18, 1936, Serial No. 85,912
In Canada June 18, 1935

3 Claims. (Cl. 23—224)

This invention relates to the treatment of arsenide ores and mixtures of arsenide and sulphide ores for the production of metal oxides, elementary sulphur and orpiment.

According to this invention the ores to be treated are heated to a suitable temperature while passing through a kiln in countercurrent contact with steam and an oxidizing gas, such as air, oxygen, or a mixture of oxygen and sulphur dioxide. The ore is heated to a temperature above 750° C. in order to promote reactions resulting in the production of metal oxides, elementary sulphur, and orpiment. The reaction gases are led from the kiln to a suitable cooling or condensing tower where the gaseous sulphur and orpiment are recovered by condensation, the remaining gases being either discharged to atmosphere or returned to the kiln admixed with a fresh supply of the steam and oxidizing gas.

Proceeding now to a more detailed description of this invention reference will be had to the accompanying drawing, wherein—

Figure 1:
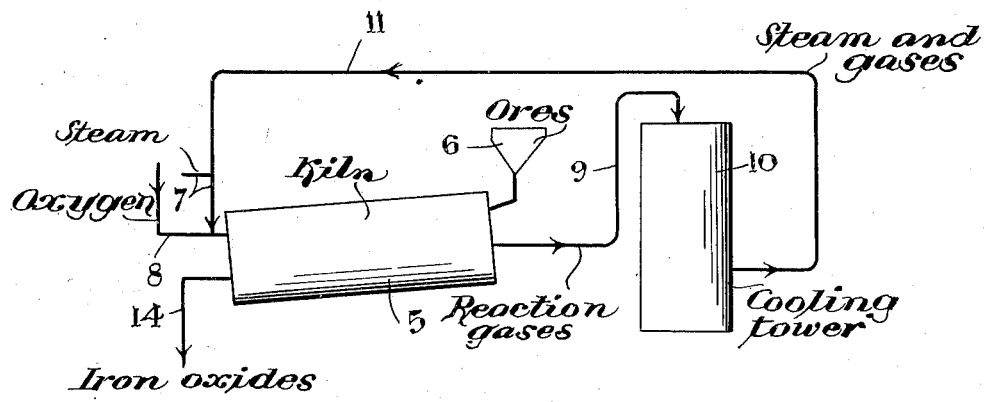
Fig. 1 is a diagrammatic view of the apparatus employed when using an oxidizing gas such as oxygen or a mixture of oxygen or sulphur dioxide.

The process will be first described as carried out with the aid of the apparatus shown in Fig. 1. A suitable mixture of iron pyrite and mispickel is continuously supplied to the upper end of the inclined rotary kiln 5 through the hopper 6. As it passes toward the lower end of the kiln the ore is heated to a temperature of from 800 to 1000° C. and is acted upon by a mixture of steam and oxygen supplied to the lower end of the kiln through the steam supply pipe 7 and the oxygen supply pipe 8. At the high temperature prevailing in the kiln the steam is partially decomposed into oxygen and hydrogen which, being in the nascent state, readily react with the mispickel and the iron pyrite to form iron oxides and oxides and hydrides of both sulphur and arsenic. If the oxygen is supplied to the kiln in sufficient quantity to convert the entire iron content of the mispickel and iron pyrite into ferric oxide the oxides and hydrides of both sulphur and arsenic will be in such proportion as to produce elementary sulphur and arsenic which readily combine to produce orpiment. While these main reactions which take place simultaneously, probably involve many side reactions, the net result may be expressed by the following equation:—

(1) $16FeAsS + 4FeS_2 + 15O_2 + 16H_2O =$
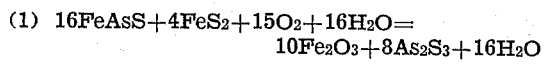
$10Fe_2O_3 + 8As_2S_3 + 16H_2O$ If there is an excess of pyrite over that given in the above equation elementary sulphur will be produced as follows:—

(2) $16FeAsS + 6FeS_2 + 16\tfrac{1}{2}O_2 + 16H_2O =$
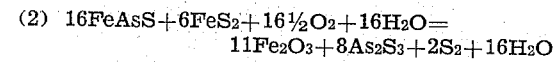
$11Fe_2O_3 + 8As_2S_3 + 2S_2 + 16H_2O$ The gaseous products of the reactions taking place in the kiln 5 are continuously passed through a pipe 9 to a cooling tower 10 where the elementary sulphur and orpiment are precipitated and recovered. The gases remaining after recovery of the sulphur and orpiment consist mainly of steam which is returned to the lower end of the kiln through the pipe 11.

In order that the arsenic may be safely recovered in the form of orpiment it is essential that sufficient sulphur be present during the reactions taking place in the kiln 5. For the most efficient working of the process and to prevent the formation of arsenious oxide the amount of sulphur present during the reactions should be somewhat in excess of that required by equation No. 1. If there is not sufficient sulphur in the ore being treated this may be remedied by the addition of sulphide ore, pure sulphur, or sulphur dioxide. When sulphur dioxide is used it is supplied to the lower end of the kiln along with the mixture of steam and oxygen. In this case the net result of the reactions taking place in kiln 5 may be expressed by the equation—

$16FeAsS + 4FeS_2 + 4SO_2 + 11O_2 + 16H_2O =$
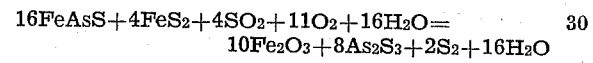
$10Fe_2O_3 + 8As_2S_3 + 2S_2 + 16H_2O$ or by the equation—

$16FeAsS + 8SO_2 + 4O_2 + 16H_2O =$
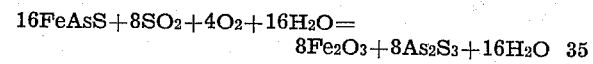
$8Fe_2O_3 + 8As_2S_3 + 16H_2O$

Figure 2:
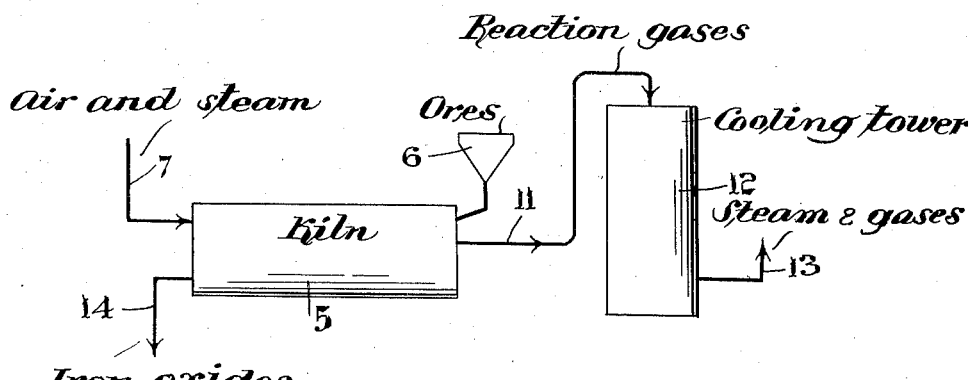
Fig. 2 is a diagrammatic view of one form of apparatus which may be employed when using air as the oxidizing gas.

When the oxidizing gas supplied to the kiln along with the steam is air instead of oxygen the process is carried out on the open-circuit principle with the aid of the apparatus shown in Fig. 2. In this case the reaction gases, consisting mainly of nitrogen, steam, elementary sulphur and orpiment, are discharged through pipe 11 to a cooling tower 12 which is provided with a vent 13 for the escape of the nitrogen and other gases remaining after precipitation of the elementary sulphur and orpiment. The metal oxides produced in accordance with this process are continuously discharged from the kiln through a suitable outlet 14.

Having thus described my invention, what I claim is:—

1. The process of treating a mixture of iron arsenide and sulphide ores to obtain iron oxides, and orpiment which comprises continuously passing the ore through a kiln in which the ore is heated to a temperature above 750° C. in the absence of reducing agents, continuously passing a mixture of steam and oxygen through the kiln in countercurrent contact with the heated ore and in such proportions as to promote reactions resulting in complete oxidation of the iron content of the ore and in the production of orpiment in a gaseous state substantially in accordance with the following equation $$16FeAsS + 4FeS_2 + 15O_2 + 16H_2O = 10Fe_2O_3 + 8As_2S_3 + 16H_2O$$

continuously withdrawing the iron oxides from one end of the kiln, continuously withdrawing the reaction gases from the opposite end of the kiln to a cooling tower where the gases are cooled sufficiently to precipitate the orpiment and continuously returning to the kiln the gases remaining in the cooling tower after recovering the orpiment.

2. The process of treating a mixture of iron arsenide and sulphide ores to produce iron oxides, elementary sulphur and orpiment which comprises continuously passing the ore through a kiln in which it is heated to a temperature above 750° C. in the absence of reducing agents, continuously passing a mixture of steam, oxygen and sulphur dioxide through the kiln in countercurrent contact with the heated ore and in such proportions as to promote reactions resulting in complete oxidation of the iron content of the ore and in the production of elementary sulphur and orpiment in the gaseous state substantially in accordance with the following equation $$16FeAsS + 4FeS_2 + 4SO_2 + 11O_2 + 16H_2O = 10Fe_2O_3 + 8As_2S_3 + 2S_2 + 16H_2O$$

continuously withdrawing the iron oxides from one end of the kiln, continuously passing the reaction gases from the opposite end of the kiln to a cooling tower where the gases are cooled sufficiently to precipitate the elementary sulphur and orpiment and continuously returning to the kiln the gases remaining in the cooling tower after the recovery of the elementary sulphur and orpiment.

3. The process of treating a mixture of iron arsenide and sulphide ores to produce iron oxides, elementary sulphur and orpiment which comprises continuously passing the ore through a kiln in which it is heated to a temperature above 750° C. in the absence of reducing agents, continuously passing a mixture of steam and air through the kiln in countercurrent contact with the heated ore and in such proportions as to promote reactions resulting in oxidation of all the iron content of the ore and in the formation of elementary sulphur and orpiment in the gaseous state, continuously withdrawing the iron oxides from one end of the kiln, continuously passing the reaction gases from the opposite end of the kiln to a cooling tower where the gases are cooled sufficiently to precipitate the elementary sulphur and orpiment and discharging to atmosphere the gases remaining in the cooling tower after the recovery of the sulphur and orpiment.

PAUL D'ARAGON.